US006546325B1

(12) United States Patent
Kubota et al.

(10) Patent No.: US 6,546,325 B1
(45) Date of Patent: Apr. 8, 2003

(54) DEVICE FOR CONTROLLING A WORKING ARM OF A WORKING MACHINE

(75) Inventors: Yorimichi Kubota, Tokyo (JP); Nobuaki Matoba, Tokyo (JP); Shinya Nozaki, Kobe (JP); Yoshikazu Kurokawa, Kobe (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 134 days.

(21) Appl. No.: 09/706,824

(22) Filed: Nov. 7, 2000

Related U.S. Application Data

(63) Continuation of application No. PCT/JP00/01894, filed on Mar. 28, 2000.

(30) Foreign Application Priority Data

Aug. 4, 1999 (JP) .......................................... 11-221137

(51) Int. Cl.[7] ................................................ G06F 17/00
(52) U.S. Cl. .............................. 701/50; 60/468; 91/361
(58) Field of Search .............................. 701/50; 60/468, 60/484; 91/361, 459, 461, 530

(56) References Cited

U.S. PATENT DOCUMENTS 4,628,690 A * 12/1986 Arai et al. .................... 60/464
5,067,321 A * 11/1991 Miyaoka ...................... 60/426
5,081,838 A * 1/1992 Miyaoka et al. .............. 37/348
5,307,631 A * 5/1994 Tatsumi et al. ............... 60/452
5,392,539 A * 2/1995 Hirata et al. .................. 37/348
6,009,708 A * 1/2000 Miki et al. ..................... 60/414
6,119,843 A * 9/2000 Robinson .................. 193/35 A
6,209,675 B1 * 4/2001 Hayashi et al. ............. 180/165
6,308,516 B1 * 10/2001 Kamada ...................... 60/450
6,334,308 B1 * 1/2002 Sato et al. .................... 60/422

* cited by examiner

*Primary Examiner*—Tan Q. Nguyen
(74) *Attorney, Agent, or Firm*—Millen, White, Zelano & Branigan, P.C.

(57) ABSTRACT

A device for controlling a working arm of a working machine, which is capable of releasing the pressure of the actuation fluid confined in the actuation cylinder of the working arm device at a predetermined pressure lower than the set pressure and of controlling the opening/closing of the cylinder relief valve.

The device comprises releasing means for a releasing a pressurized fluid feed/drain circuit of an actuation cylinder of a working arm device at a predetermined pressure lower than a set pressure of a cylinder relief valve provided for said feed/drain circuit and a control means for controlling the opening/closing of the releasing means.

16 Claims, 11 Drawing Sheets

68d, 68e : ELECTROMAGNETIC CHANGE – OVER VALVE DRIVE UNIT 90a, 90b : SIGNAL – SETTING UNIT
90c, 90d : SIGNAL CHANGE – OVER UNIT
90e, 90f : ELECTROMAG. PROPOTIONAL REDUCING VALVE DRIVE UNIT
92a, 92b : ELECTROMAG. PROPOTIONAL REDUCING VALVE

DEVICE FOR CONTROLLING A WORKING ARM OF A WORKING MACHINE

This application is a continuation of International Application PCT/JP00/01894, filed Mar. 28, 2000, designating the United States, priority of which is claimed under 35 U.S.C. §120.

TECHNICAL FIELD

The present invention relates to a device for controlling a working arm of a working machine. More specifically, the invention relates to a device for controlling a working arm, which is capable of suitably controlling a pressure that generates and is confined in a hydraulic cylinder provided in a working arm device of a working machine such as a front shovel device of a hydraulic shovel, a lift arm device of a wheel loader, and the like.

BACKGROUND ART

With reference to FIG. 8, a hydraulic shovel as generally designated at 2, which is a typical working machine equipped with a working arm device, includes a lower running body 4 and an upper turning body 6 mounted on the lower running body 4 to freely turn on a pivot 5. The upper turning body 6 is provided with a front shovel device 8 that is a working arm device. The front shovel device 8 includes a boom 10 mounted on the upper turning body 6 to freely turn in the up and down directions, a boom actuation cylinder 12 interposed between the upper turning body 6 and the boom 10, an arm 14 mounted on an end of the boom 10 to freely turn, an arm actuation cylinder 16 interposed between the arm 14 and the boom 10, an attachment 18 attached to an end of the arm 14 to freely turn, such as a breaker, and an attachment actuation cylinder 20 interposed between the attachment 18 and the boom 10.

With reference to FIG. 8 together with FIG. 9, the hydraulic shovel 2 is equipped with the above-mentioned hydraulic actuators and a hydraulic pressure control unit for controlling the actuation of the hydraulic actuators such as the attachment 18, a turning motor 22 and a pair of running motors 24*a*, 24*b*. The hydraulic pressure control unit includes hydraulic pumps 28*a*, 28*b* driven by a motor 26, and a control valve 30 that controls a blow-out fluid to supply it to the hydraulic actuators. The control valve 30 includes plural direction control valves corresponding to each of the hydraulic actuators. A direction control valve 32 is connected to the arm actuation cylinder 16, a direction control valve 34 is connected to the attachment actuation cylinder 20, and a direction control valve 36 is connected to the boom actuation cylinder 12. The direction control valve 32 is operated by a pilot fluid output from an arm operation remote control valve 38*a* of a pilot operation means 38, and the direction control valve 34 is operated by a pilot fluid output from an attachment operation remote control valve 38*b* of the operation means 38. To a fluid passage 40*a* on the rod side, which is a pressurized fluid feed/drain circuit connecting the attachment actuation cylinder 20 to the direction control valve 34, there are connected a cylinder relief valve 42*a* for limiting the hydraulic pressure in the fluid passage 40*a* and a check valve 44*a* that permits flow of the actuation fluid from a tank 46 into the fluid passage 40*a*. Similarly, a cylinder relief valve 42*b* and a check valve 44*b* are connected to a fluid passage 40*b* of the head side.

With further reference to FIGS. 10 and 11, when the attachment actuation cylinder 20 is extended and contracted by the operation of the attachment operation remote control valve 38*b*, the attachment 18 pivots on an end of the arm 14 between a position where the attachment 18 is pulled toward the side of the upper turning body 6 shown in FIG. 10 and a position where the attachment 18 is separated far away from the upper turning body 6 shown in FIG. 11. The arm 14 is provided with stoppers 14*a* and 14*b* for limiting the turning ends of the attachment 18. When the arm actuation cylinder 16 is extended and contracted by the operation of the arm operation remote control valve 38*a*, the arm 14 pivots on an end of the boom 10 as a center between a position (solid lines) where the attachment 18 is pulled toward the upper turning body 6 shown in FIGS. 10 and 11 and a position (two-dot chain lines) where the attachment 18 is separated far away from the upper turning body 6 shown in FIGS. 10 and 11. Thus, the attachment 18 can be brought to any desired position to meet the work.

Referring to FIGS. 10 and 11 illustrating the working states of the working arm device 8, FIG. 10 shows a state where the attachment actuation cylinder 20 is contracted to fully turn the attachment 18 until it comes into contact with the stopper 14*a* to maintain the attachment actuation cylinder 20 in a state of being not in operation and the arm actuation cylinder 16 is extended to turn the arm 14 in a direction of an arrow U to lift it up. FIG. 11 shows a state where the attachment actuation cylinder 20 is extended to bring the attachment 18 into contact with the other stopper 14*b* to maintain the attachment actuation cylinder 20 in a state of being extended and the arm actuation cylinder 16 is contracted to turn the arm 14 in a direction of an arrow D to lower it down.

In the state of FIG. 10, as the arm actuation cylinder 16 is extended, the overall length of the attachment actuation cylinder 20 in its state of being maintained extends from X1 to X2 due to a difference in the positions of mounting the arm 14 and of mounting the attachment actuation cylinder 20 on the boom 10. The extension of the attachment actuation cylinder 20 in this state of being maintained is accomplished by releasing the actuation fluid in a fluid chamber 20*a* on the rod side, that is compressed with the progress of extension, into a tank 46 under a set pressure of the cylinder relief valve 42*a*, and filling up a fluid chamber 20*b* on the head side with the actuation fluid from the tank 46 via a check valve 44*a*.

In the state shown in FIG. 11, as the arm actuation cylinder 16 is contracted, the overall length of the attachment actuation cylinder 20 in its state of being maintained contracts from X3 to X4. The actuation fluid in the fluid chamber 20*b* on the head side, that is compressed with the progress of contraction, is released into the tank 46 under a set pressure of the cylinder relief valve 42*b* and the fluid chamber 20*a* on the rod side is filled up with the actuation fluid from the tank 46 via a check valve 44*b*.

DISCLOSURE OF THE INVENTION

The above-mentioned conventional working arm device involves problems that must be solved as described below.

That is, as the attachment 18 comes into contact with the stopper 14*a* or 14*b* thereby to bring the attachment actuation cylinder 20 into a state of being not in operation and the arm actuation cylinder 16 is extended or contracted, the cylinder relieve valve 42*a* or 42*b* works to release the actuation fluid confined in the attachment actuation cylinder 20. Therefore, the hydraulic force for extending or contracting the arm actuation cylinder 16 is raised by an amount of energy for releasing the actuation fluid from the relief valve 42*a* or 42*b*. Hence, this amount becomes a loss of energy.

In addition, the above energy released with a high pressure turns into heat and causes the actuation fluid to be overheated. Further, the actuation speed of the arm actuation cylinder 16 decreases due to an increase in the load resistance at the time of extension or contraction. Depending upon the weight of the attachment 18 and positions of turning of the attachment 18 and the arm 14, further, the arm actuation cylinder 16 comes into a halt due to the load resistance. Consequently, the workability of the working arm device 8 is deteriorated.

Though this problem can be improved if the set pressure of the cylinder relief valves 42*a* and 42*b* is lowered, the lowering of the set pressure results in a decrease in a maximum output of the attachment actuation cylinder 20 limited by the set pressure and in a decrease in the force for holding the attachment 18 to the arm 14 thereby to weaken the operation force of the attachment 18, with the consequence that the attachment 18 moves due to the external force during the working or the attachment 18 moves due to its own weight, making it difficult to carry out the operation appropriately.

The present invention has been done in view of the above-mentioned facts, and its technical assignment is to provide a device for controlling a working arm of a working machine, which is capable of releasing the pressure of the actuation fluid confined in the actuation cylinder of the working arm device at a predetermined pressure lower than the set pressure without changing the set pressure of the cylinder relief valve and in which the opening/closing of the cylinder relief valve is controlled.

In order to solve the above-mentioned technical assignment, the present invention provides a device for controlling a working arm of a working machine comprising:

a releasing means for releasing a pressurized fluid feed/drain circuit of an actuation cylinder of a working arm device at a predetermined pressure lower than a set pressure of a cylinder relief valve provided for the feed/drain circuit; and a control means for controlling the opening/closing of the releasing means.

The releasing means is operated by the control means to meet the actuation state of the working arm device, and the pressure that generates and is confined in the actuation cylinder is released at a pressure lower than the set pressure of the cylinder relief valve.

According to a preferred embodiment, the working arm device includes a turnable arm member, a turning member mounted on the arm member so as to freely turn, an arm member actuation cylinder for actuating the arm member, a turning member actuation cylinder for actuating the turning member, and stoppers for limiting the turning ends of the turning member, and the control means operates the releasing means in a state where the turning member is in contact with the stopper, the turning member actuation cylinder is not in operation and the arm member actuation cylinder is in operation.

The pressure confined in the turning member actuation cylinder that elevates due to the contact of the turning member of the working arm device with the stopper, is released at a pressure lower than the set pressure of the cylinder relief valve.

The control means includes a contact detector means for detecting the contact of the turning member with the stopper and an operation detector means for detecting the operation of the turning member actuation cylinder, and operates the releasing means by using an operation signal for operating the arm member actuation cylinder based on output signals from the contact detector means and the operation detector means.

The releasing means is operated by a signal that operates the arm member actuation cylinder while the contact detector means detects the contacting state and the operation detector means detects the non-operating state.

According to a preferred embodiment, the releasing means includes a direction change-over valve connected to the pressurized fluid feed/drain circuit and a relief valve connected to the outlet port of the direction change-over valve, and changes over the direction change-over valve by using the control means.

The direction change-over valve is changed over by the control means, and the confined pressure is released at a low pressure through the relief valve that is set to a predetermined low pressure.

According to a further embodiment, the releasing means includes a set pressure-varying relief valve for varying the set pressure in response to an external signal and an adjustment means for adjusting the external signal, and controls the external signal by using the control means.

The external signal for setting the set pressure of the set pressure-varying relief valve to a predetermined low pressure is adjusted by the adjustment means and is controlled by the control means.

The arm member actuation cylinder is operated by a pilot operation means, and uses a pilot fluid output from the operation means as the operation signal.

The pilot fluid output from the operation means is fed as an operation signal to the releasing means at the time of operating the arm member actuation cylinder, and the releasing member is actuated being interlocked to the operation of the arm member actuation cylinder.

BEST MODE FOR CARRYING OUT THE INVENTION

Figure 1:
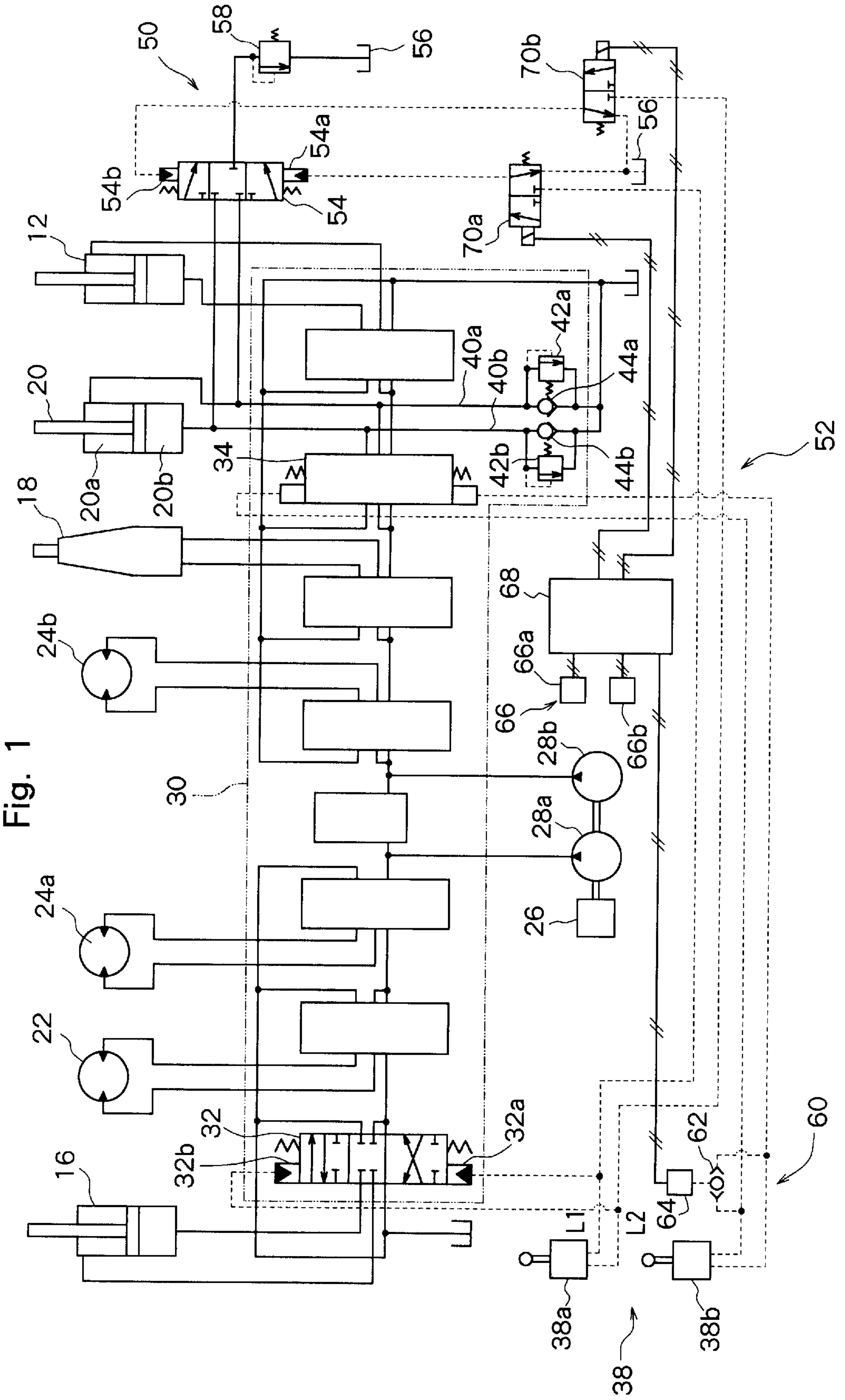
FIG. 1 is a diagram of a hydraulic circuit illustrating the first embodiment of a device for controlling a working arm of a working machine constituted according to the present invention. In the drawing, the portions that are not directly related to the invention are simply diagramed.

The device for controlling a working arm of a working machine constituted according to the present invention will now be described in further detail with reference to the accompanying drawings. The drawings illustrate preferred embodiments of a hydraulic shovel that is a typical working machine equipped with a working arm. In FIGS. 8 to 11, the portions which are substantially the same as those of FIGS. 1 to 7 are denoted by the same reference numerals, but their description is not repeated as a rule.

Figure 2:
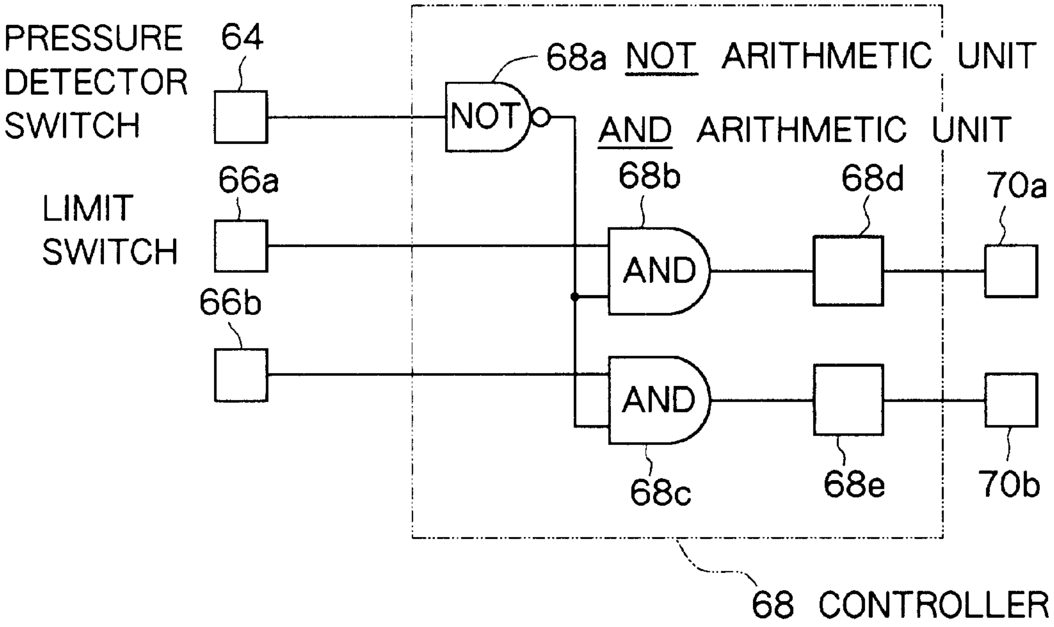
FIG. 2 is a diagram of an operation circuit of a controller shown in FIG. 1.
Figure 3:
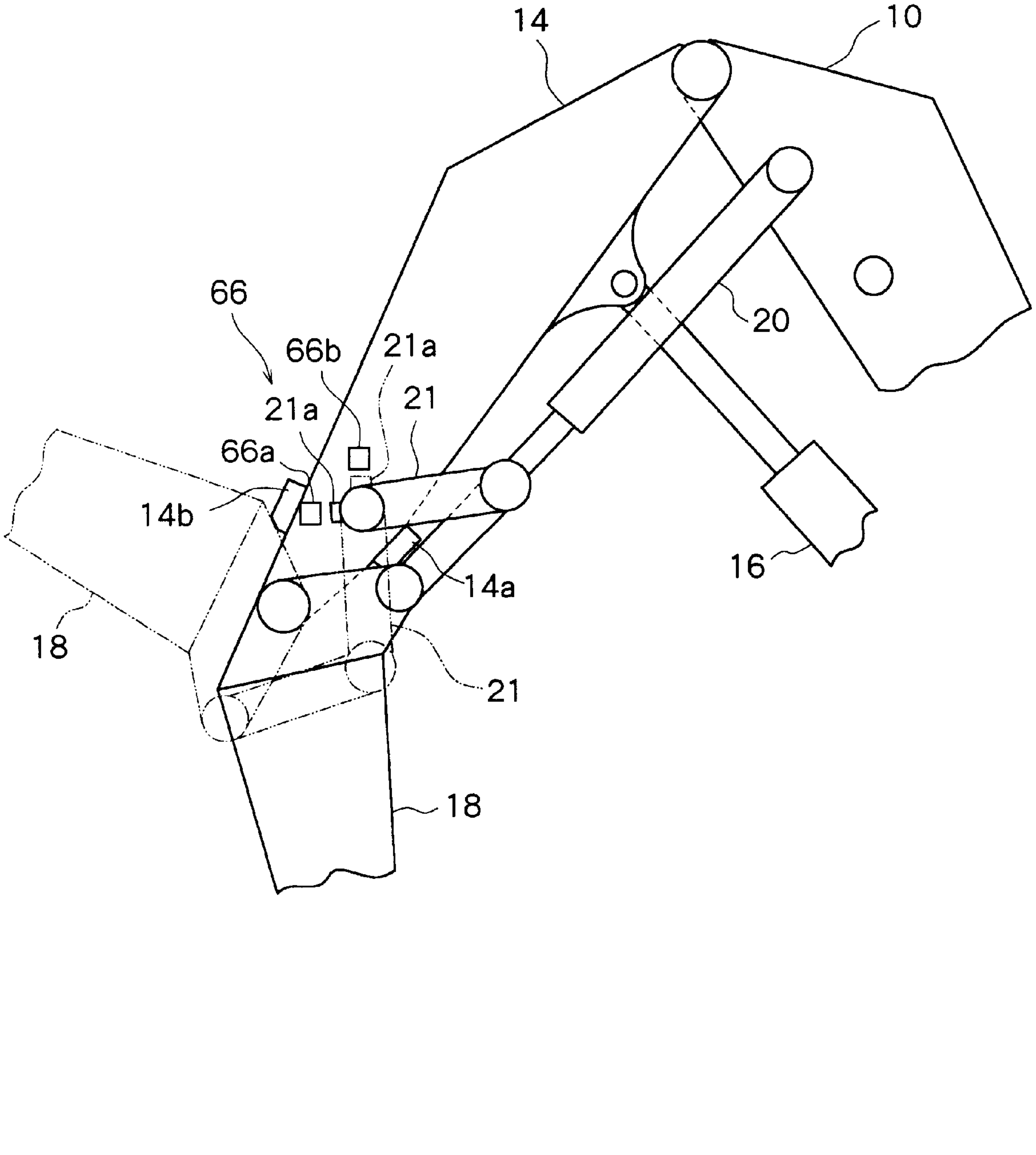
FIG. 3 is a partial side view of a working arm device illustrating a state of mounting a limit switch of the contact detector means shown in FIG. 1.

The first embodiment will be described with reference to FIGS. 1 to 3. With reference to FIG. 1, the device for controlling a working arm includes a releasing means 50 for releasing the pressure confined in the actuation cylinder at a predetermined pressure lower than a set pressure of a cylinder relief valve and a control means 52 for controlling the opening/closing of the releasing means 50 in response to the actuation condition of the working arm device.

The releasing means 50 includes a direction change-over valve 54 that is connected to a fluid passage 40*a* on the rod side and to a fluid passage 40*b* on the head side, which form a pressurized fluid feed/drain circuit linking an attachment actuation cylinder 20 which is a turning member actuation cylinder to a direction control valve 34 therefor, and further includes a relief valve 58 provided between an outlet port of the direction change-over valve 54 and a tank 56. The direction change-over valve 54 is a three-position valve which is changed over by a pilot pressurized fluid, and of which pilot chambers 54*a* and 54*b* are connected to fluid passages for conducting a pilot pressurized fluid that is an operation signal from the control means 52. When there is no pilot pressurized fluid, the direction change-over valve is maintained at a neutral position (which is a state shown in FIG. 1) and the fluid passages 40*a* and 40*b* are disconnected from the relief valve 58. When changed over upon receiving the pilot pressurized fluid, the fluid passage 40*a* or 40*b* is connected to the relief valve 58. The set pressure of the relief valve 58 is set to a minimum predetermined pressure lower than a set pressure of the cylinder relief valves 42*a* and 42*b*, which is capable of, for example, supporting the weight of the attachment 18.

The control means 52 includes an operation detector means 60, a contact detector means 66, a controller 68, and a pair of electromagnetic change-over valves 70*a* and 70*b*. The operation detector means 60 has a high pressure selection valve 62 connected with a pair of outlet ports of an attachment operation remote control valve 38*b* and a pressure detector switch 64 provided at an outlet port of the high pressure selection valve 62. The contact detector means 66 has limit switches 66*a* and 66*b* for detecting the contact between the attachment 18 which is a turning member and the stopper 14*a* or 14*b* (the contact detector means 66 will be described later in detail). To the controller 68 are connected the operation detector means 60 and the contact detector means 66 (the controller 68 will be described later in detail). A pair of divided output fluid passages L1 and L2 of the arm operation remote control valve 38*a* for operating the arm 14 that is an arm member are respectively connected to the inlet ports of the pair of electromagnetic change-over valves 70*a* and 70*b*, and the outlet ports thereof are respectively connected to the pilot chambers 54*a* and 54*b* of the direction change-over valve 54 of the releasing means 50. The electromagnetic change-over valves 70*a* and 70*b* are two-position change-over valves which are changed over by an output signal from the controller 68. The connection to their inlet ports and outlet ports is interrupted when there is no output signal. Upon receipt of an output signal, the change-over valves are changed over to make a connection.

The controller 68 will be described with reference to FIG. 2. The controller 68 includes a NOT arithmetic unit 68*a*, AND arithmetic units 68*b* and 68*c*, and electromagnetic change-over valve drive units 68*d* and 68*e*. The NOT arithmetic unit 68*a* inverts the output signal of the pressure detector switch 64. The AND arithmetic unit 68*b* calculates the output signals of the NOT arithmetic unit 68*a* and the limit switch 66*a*, and outputs the result to the electromagnetic change-over valve drive unit 68*d*. The AND arithmetic unit 68*c* calculates the output signals of the NOT arithmetic unit 68*a* and the limit switch 66*b*, and outputs the result to the electromagnetic change-over valve drive unit 68*e*. The electromagnetic change-over valve drive unit 68*d* is connected to the electromagnetic change-over valve 70*a*, and the electromagnetic change-over valve drive unit 68*e* is connected to the electromagnetic change-over valve 70*b*.

The contact detector means 66 will be described with reference to FIG. 3. Limit switches 66*a* and 66*b* are attached to the arm 14, and the contact between the attachment 18 and the stopper 14*a* or 14*b* is detected from a turned position of a protrusion 21*a* of a link 21 which is interposed between the attachment actuation cylinder 20 and the attachment 18 and of which the one end is pivotably attached to the arm 14. That is, the limit switch 66*a* detects a state (indicated by solid lines) where the attachment actuation cylinder 20 is contracted to bring the attachment 18 into contact with the stopper 14*a*, and the limit switch 66*b* detects a state (indicated by two-dot chain lines) where the attachment actuation cylinder 20 is extended to bring the attachment 18 into contact with the stopper 14*b*.

Action of the above-mentioned first embodiment will be described with reference to FIGS. 1 to 3 and FIGS. 10 and 11. First, the limit switch 66*a* is turned ON when the attachment 18 comes in contact with the stopper 14*a* (solid lines in FIG. 3) in a state where the attachment actuation cylinder 20 is contracted. When the attachment operation remote control valve 38*b* is not operated, the output signal of the pressure detector switch 64 becomes OFF which is, then, inverted through the NOT arithmetic unit 68*a* to produce an ON signal. Therefore, the AND arithmetic unit 68*b* receiving the ON signal from the limit switch 66*a* produces an ON signal, whereby the electromagnetic change-over valve drive unit 68*d* drives the electromagnetic change-over valve 70*a* to effect change-over. In this state, when the arm operation remote control valve 38*a* is operated toward the side of extending the arm actuation cylinder 16 (i.e., the arm 14 turns in a direction indicated by an arrow U in FIG. 10), the output pilot fluid flows into the fluid passage L1 and is guided into the one pilot chamber 32*a* of the direction control valve 32 for arm, and is further guided, as a change-over signal, into the one pilot chamber 54*a* of the direction change-over valve 54 of the releasing means 50 through the electromagnetic change-over valve 70*a* that has been changed over, whereby the direction change-over valve 54 is changed over to connect the fluid chamber 20*a* on the rod side of the attachment actuation cylinder 20 to the relief valve 58. Accordingly, the actuation fluid in the fluid chamber 20*a* on the rod side is released to the tank 56 through the relief valve 58 at a predetermined low pressure. Since the pressure of the relief valve 58 has been set to a pressure capable of supporting the weight of the attachment 18, the attachment actuation cylinder 20 extends while supporting the weight of the attachment 18.

Next, the limit switch 66*b* is turned ON when the attachment 18 comes into contact with the stopper 14*b* (two-dot chain lines in FIG. 3) in a state where the attachment actuation cylinder 20 is extended. When the attachment operation remote control valve 38*a* is not operated, the output signal of the pressure detector switch 64 becomes OFF which is, then, inverted through the NOT arithmetic unit 68*a* to produce an ON signal. Therefore, the AND arithmetic unit 68*c* receiving the ON signal from the limit switch 66*b* outputs an ON signal, and the electromagnetic change-over valve 70*b* is driven by the electromagnetic change-over valve drive unit 68*e* to effect change-over. In this state, when the arm operation remote control valve 38*a* is operated toward the side of contracting the arm actuation cylinder 16 (i.e., the arm 14 turns in a direction indicated by an arrow D in FIG. 11), the output pilot fluid flows into the fluid passage L2 and is guided into the other pilot chamber 32*b* of the direction control valve 32 for arm, and is further guided, as a change-over signal, into the other pilot chamber 54*b* of the direction change-over valve 54 of the releasing means 50 through the electromagnetic change-over valve 70*b* that has been changed over, whereby the direction change-over valve 54 is changed over to connect the fluid chamber 20*b* on the head side of the attachment actuation cylinder 20 to the relief valve 58. Accordingly, the actuation fluid in the fluid chamber 20*b* on the head side is released into the tank 56 through the relief valve 58 at a predetermined low pressure. Since the pressure of the relief valve 58 has been set to a pressure capable of supporting the weigh of the attachment 18, the attachment actuation cylinder 20 contracts while supporting the weight of the attachment 18.

When the attachment operation remote control valve 38*b* is operated during the above action, the output signal of the pressure detector switch 64 is turned ON due to the output pilot fluid guided through the high pressure selection valve 62, and is then inverted through the NOT arithmetic unit 68*a* to output an OFF signal. Then, the AND arithmetic unit 68*b* or 68*c* produces an OFF signal, the electromagnetic change-over valve 70*a* or 70*b* is turned OFF (position shown in FIG. 1), and the direction change-over valve 54 returns to the neutral position (position shown in FIG. 1) with their pilot chambers 54*a* and 54*b* being drained into the tank 56. Therefore, the releasing means 50 does not actuate.

By the above-mentioned action, loss of energy can be decreased and the operability can be improved because even when the arm actuation cylinder 16 is actuated in a state where the attachment 18 is in contact with the stopper 14*a* or 14*b* and the attachment actuation cylinder 20 is in a state of being maintained at its position, the pressure confined in the attachment actuation cylinder 20 is released at a predetermined pressure lower than the set pressure of the cylinder relief valves 42*a,* 42*b* and the attachment actuation cylinder 20 can be extended or contracted while supporting the weight of the attachment 18.

Figure 4:
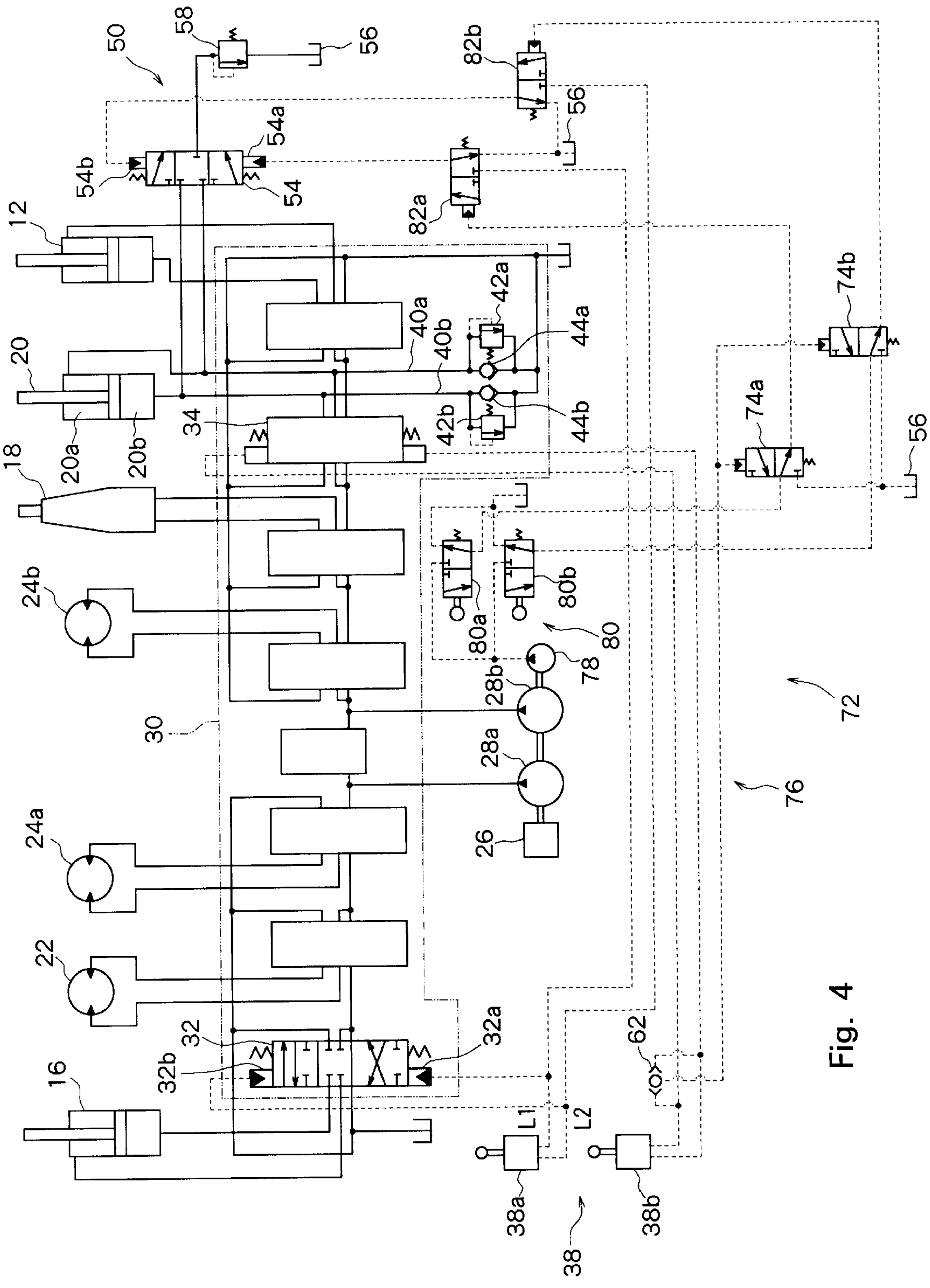
FIG. 4 is a diagram of a hydraulic circuit illustrating the second embodiment of the device for controlling a working arm of a working machine constituted according to the present invention. Similarly to FIG. 1, some portions are simply diagramed.
Figure 5:
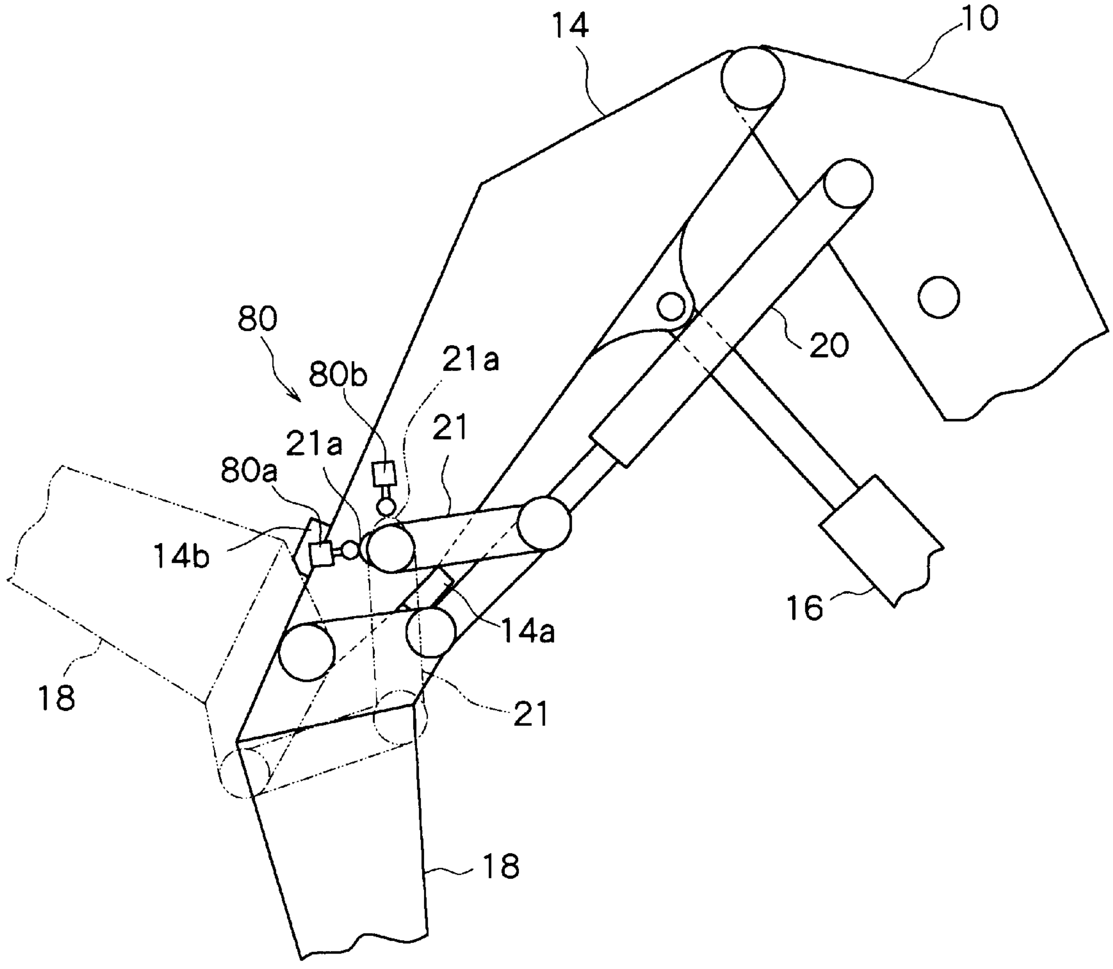
FIG. 5 is a partial side view of the working arm device illustrating a state of mounting a change-over valve of the contact detector means.

The second embodiment will now be described with reference to FIGS. 4 and 5. With reference to FIG. 4, the device for controlling a working arm includes a releasing means 50 for releasing the pressure confined in the actuation cylinder at a predetermined pressure lower than a set pressure of a cylinder relief valve and a control means 72 for controlling the opening/closing of the releasing means 50 in response to the operation condition of the working arm device. The releasing means 50 is the same as employed in the above first embodiment and is not described here.

The control means 72 includes an operation detector means 76, a contact detector means 80, a pair of pilot change-over valves 74*a,* 74*b,* and a pair of pilot change-over valves 82*a,* 82*b*. The operation detector means 76 has a high pressure selection valve 62 connected to a pair of outlet ports of an attachment operation remote control valve 38*b*. The contact detector means 80 has change-over valves 80*a* and 80*b* that are changed over and output a pilot blow-out fluid from a pilot pump 78 when the attachment 18 comes into contact with the stopper 14*a* or 14*b* (the contact detector means 80 will be described later in detail). The pilot change-over valves 74*a* and 74*b* are two-position change-over valves which are turned on and off by the output of the high pressure selection valve 62, and the inlet ports thereof are respectively connected to the outlet ports of the change-over valves 80*a* and 80*b*. The connection to their inlet ports and outlet ports is interrupted when there is no output from the high pressure selection valve 62, while upon receipt of an output, the connection between the inlet ports and the outlet ports is interrupted. The pilot change-over valves 82*a* and 82*b* are two-position change-over valves that are turned on and off by the outputs of the pilot change-over valves 74*a* and 74*b,* and their inlet ports are connected with the divided output fluid passages L1 and L2 of the arm operation remote control valve 38*a* and their outlet ports are connected with the pilot chambers 54*a* and 54*b* of the direction change-over valve 54 of the releasing means 50. When there are no outputs from the pilot change-over valves 74 and 74*b,* the connection between the inlet ports and the outlet ports is interrupted. Upon receipt of an output, connection is made between the inlet ports and the outlet ports.

The contact detector means 80 will be described with reference to FIG. 5. Change-over valves 80*a* and 80*b* are attached to the arm 14, and the contact between the attachment 18 and the stopper 14*a* or 14*b* is detected from a changing-over effected by bring the change-over valves 80*a* or 80*b* into contact with a protrusion 21*a* of the link 21 which is interposed between the attachment actuation cylinder 20 and the attachment 18 and of which the one end is pivotably attached to the arm 14. That is, the change-over valve 80*a* detects a state (indicated by solid lines) where the attachment actuation cylinder 20 is contracted to bring the attachment 18 into contact with the stopper 14*a,* and the change-over valve 80*b* detects a state (indicated by two-dot chain lines) where the attachment actuation cylinder 20 is extended to bring the attachment 18 into contact with the stopper 14*b*.

Figure 10:
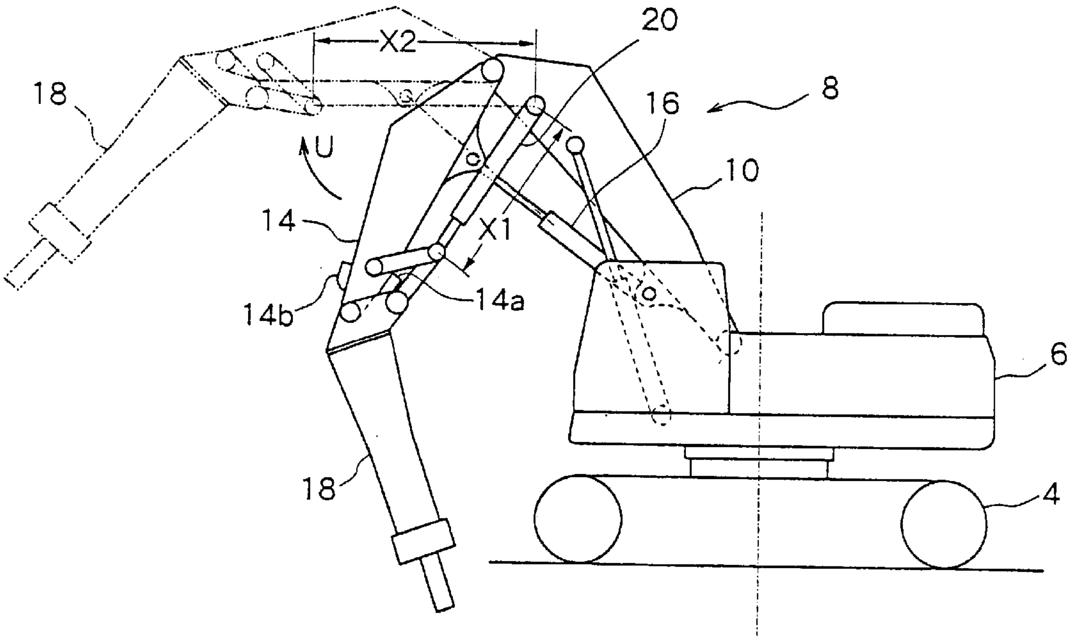
PRIOR ART Fig. 10
FIG. 10 is a diagram illustrating a state where an attachment actuation cylinder of the working arm device is maintained in a contracted state and the arm actuation cylinder is extended.
Figure 11:
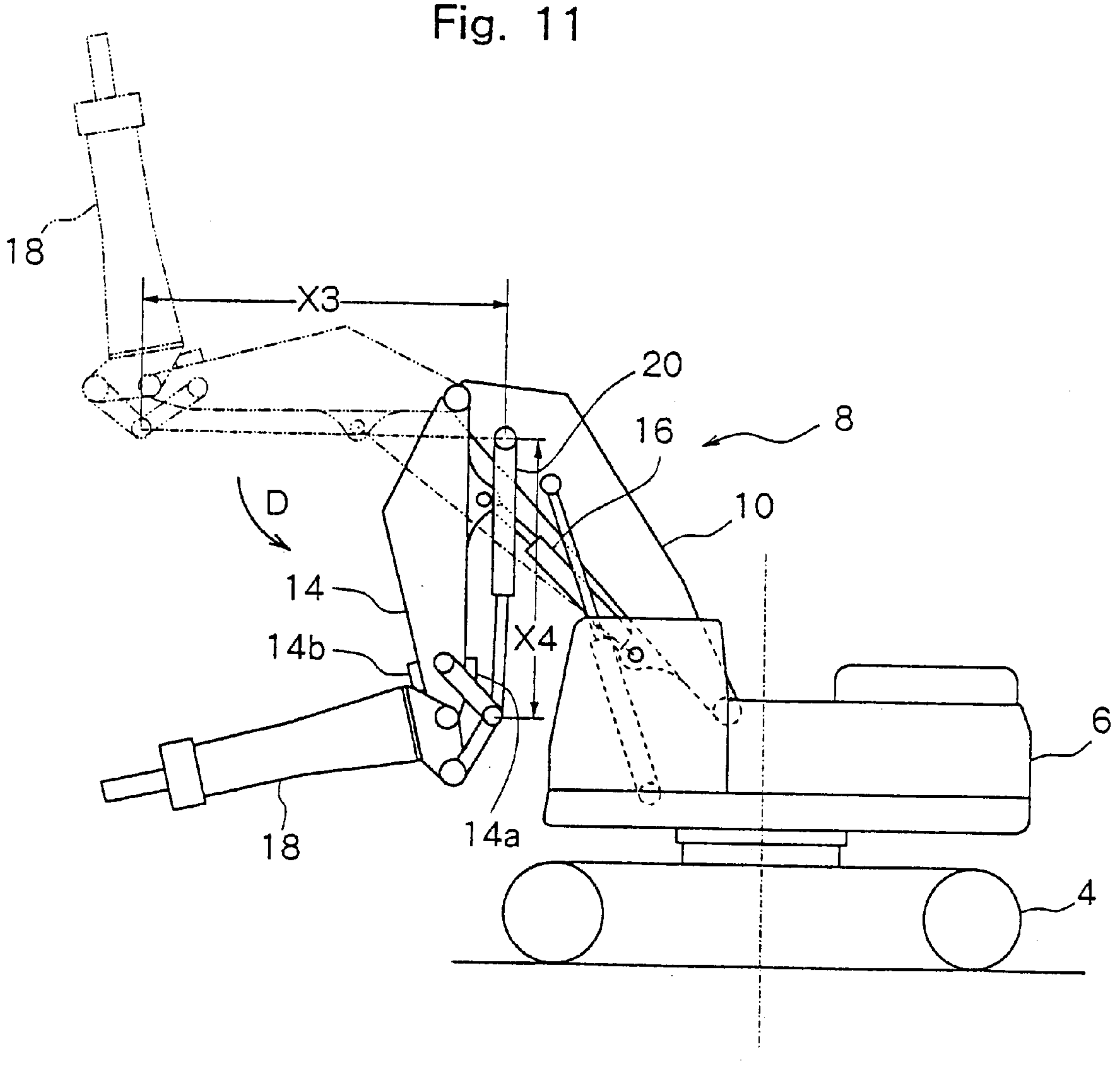
PRIOR ART Fig. 11
FIG. 11 is a diagram illustrating a state where the attachment actuation cylinder of the working arm device is maintained in an extended state and the arm actuation cylinder is contracted.

Action of the above-mentioned second embodiment will be described with reference to FIGS. 4 and 5 together with FIGS. 10 and 11. First, the change-over valve 80*a* is changed over when the attachment 18 comes in contact with the stopper 14*a* (solid lines in FIG. 5) in a state where the attachment actuation cylinder 20 is contracted. When the attachment operation remote control valve 38*b* is not operated, the pilot valve change-over valve 74*a* is not changed over. Therefore, the pressurized fluid in the pilot pump 78 is guided into the pilot chamber of the pilot change-over valve 82*a* through the change-over valve 80*a* and pilot change-over valve 74*a,* thereby to change over the pilot change-over valve 82*a*. In this state, when the arm operation remote control valve 38*a* is operated toward the side of extending the arm actuation cylinder 16 (i.e., the arm turns in a direction indicated by the arrow U in FIG. 10), the output pilot fluid flows into the fluid passage L1 and is guided into the one pilot chamber 32*a* of the direction control valve 32 for arm, and is further guided, as a change-over signal, into the one pilot chamber 54*a* of the direction change-over valve 54 of the releasing means 50 through the pilot change-over valve 82*a* that has been changed over, whereby the direction change-over valve 54 is changed over to connect the fluid chamber 20*a* on the rod side of the attachment actuation cylinder 20 to the relief valve 58. Accordingly, the actuation fluid in the fluid chamber 20*a* on the rod side is released into the tank 56 through the relief valve 58 at a predetermined low pressure. Since the pressure of the relief valve 58 has been set to be capable of supporting the weight of the attachment 18, the attachment actuation cylinder 20 extends while supporting the weight of the attachment 18.

Next, the change-over valve 80*b* is changed over when the attachment 18 comes into contact with the stopper 14*b* (two-dot chain lines in FIG. 5) in a state where the attachment actuation cylinder 20 is extended. When the attachment operation remote control valve 38*a* is not operated, the pilot change-over valve 74*b* is not changed over. Therefore, the pressurized fluid from the pilot pump 78 is guided into the pilot chamber of the pilot change-over valve 82*b* through the change-over valve 80*b* and the pilot change-over valve 74*b* to change over the pilot change-over valve 82*b*. In this state, when the arm operation remote control valve 38*a* is operated toward the side of contracting the arm actuation cylinder 16, the output pilot fluid flows into the fluid passage L2 and is guided into the other pilot chamber 32*b* of the direction control valve 32 for arm, and is further guided, as a change-over signal, into the other pilot chamber 54*b* of the direction change-over valve 54 of the releasing means 50 through the pilot change-over valve 82*b* that has been changed over, whereby the direction change-over valve 54 is changed over to connect the fluid chamber 20*b* on the head side of the attachment actuation cylinder 20 to the relief valve 58. Accordingly, the actuation fluid in the fluid chamber 20*b* on the head side is released into the tank 56 through the relief valve 58 at a predetermined low pressure. Since the pressure of the relief valve 58 has been set to be capable of supporting the weight of the attachment 18, the attachment actuation cylinder 20 contracts while supporting the weight of the attachment 18.

When the attachment operation remote control valve 38*b* is operated during the above action, the pilot change-over valves 74*a* and 74*b* are changed over due to the output pilot fluid guided through the high pressure selection valve 62, and the output from the pilot change-over valves 74*a* and 74*b* to the pilot change-over valves 82*a* and 82*b* is interrupted. And, the pilot change-over valves 82*a* and 82*b* are changed over to a position to interrupt the output to the pilot chambers 54*a* and 54*b* of the direction change-over valve 54, and the direction change-over valve 54 returns to the neutral position (position shown in FIG. 1). Therefore, the releasing means 50 does not actuate.

By the above-mentioned action, loss of energy can be decreased and the operability can be improved because even when the arm actuation cylinder 16 is actuated in a state where the attachment 18 is in contact with the stopper 14*a* or 14*b* and the attachment actuation cylinder 20 is in a state of being maintained at its position, the pressure confined in the attachment actuation cylinder 20 is released at a predetermined pressure lower than the set pressure of the cylinder relief valves 42*a,* 42*b* and the attachment actuation cylinder 20 is extended or contracted while supporting the weight of the attachment 18.

Figure 6:
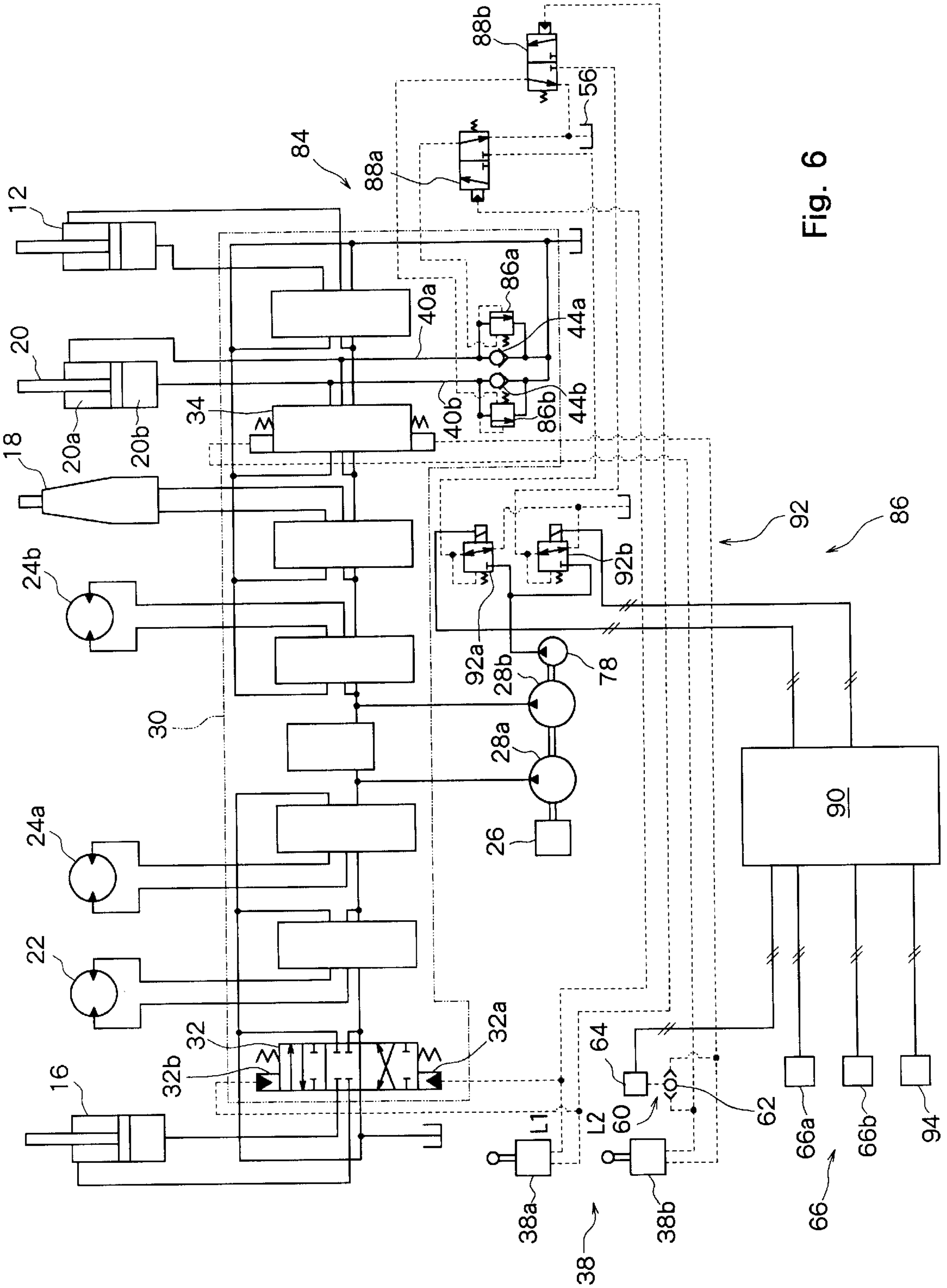
FIG. 6 is a diagram of a hydraulic circuit illustrating the third embodiment of the device for controlling a working arm of a working machine constituted according to the present invention. In the drawing, some portions are simply diagramed like in FIG. 1.
Figure 7:
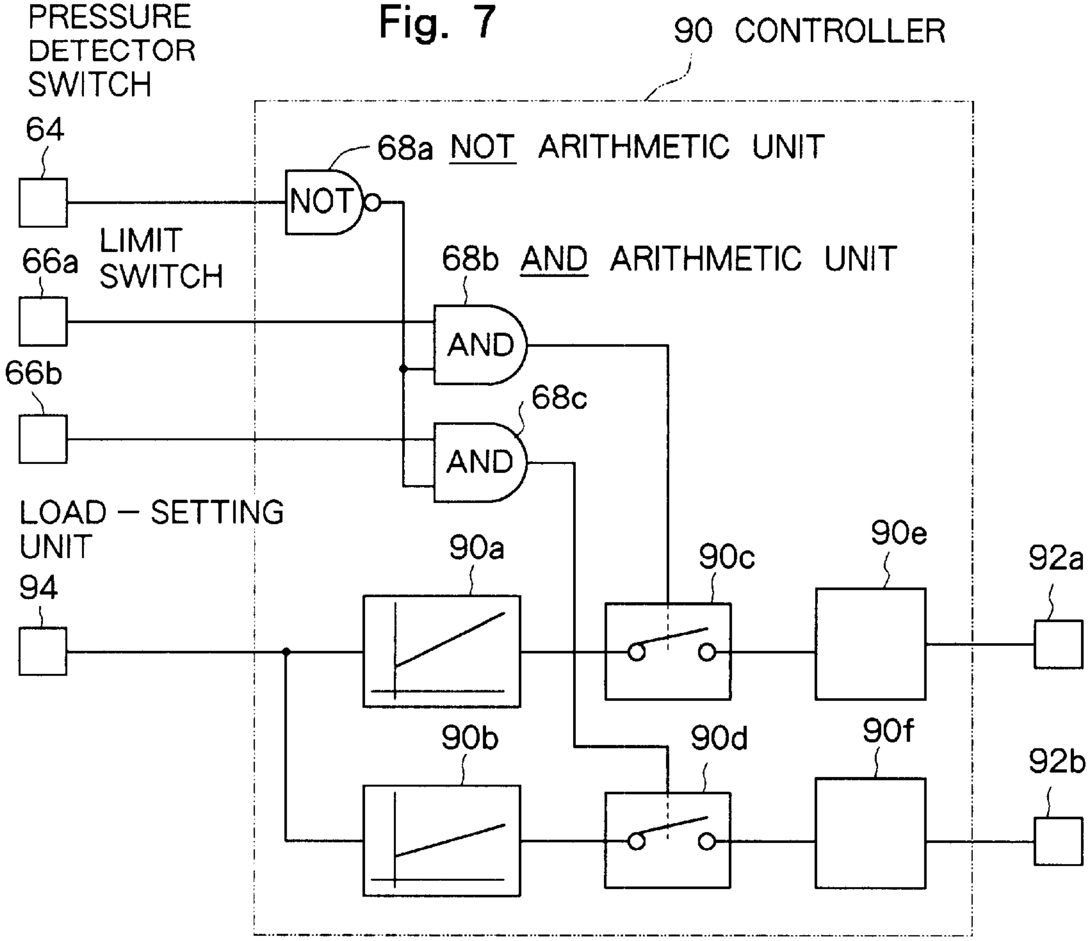
FIG. 7 is a diagram of an operation circuit of a controller shown in FIG. 6.
Figure 8:
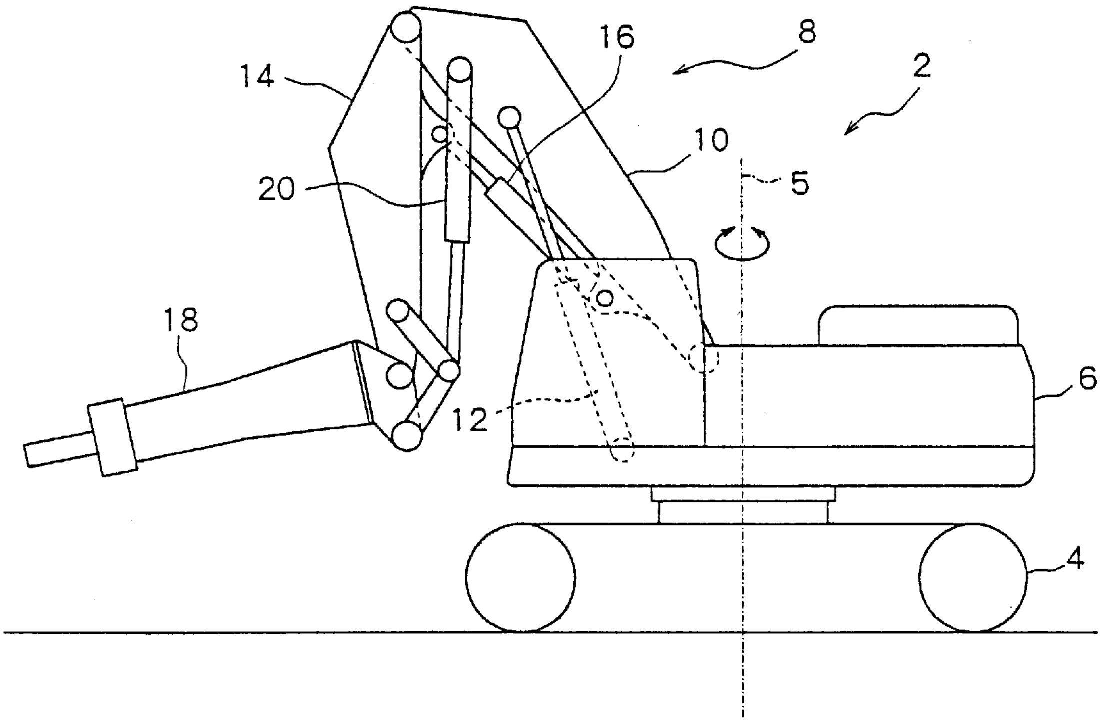
PRIOR ART Fig. 8
FIG. 8 is a side view of a hydraulic shovel mounting a front shovel device.
Figure 9:
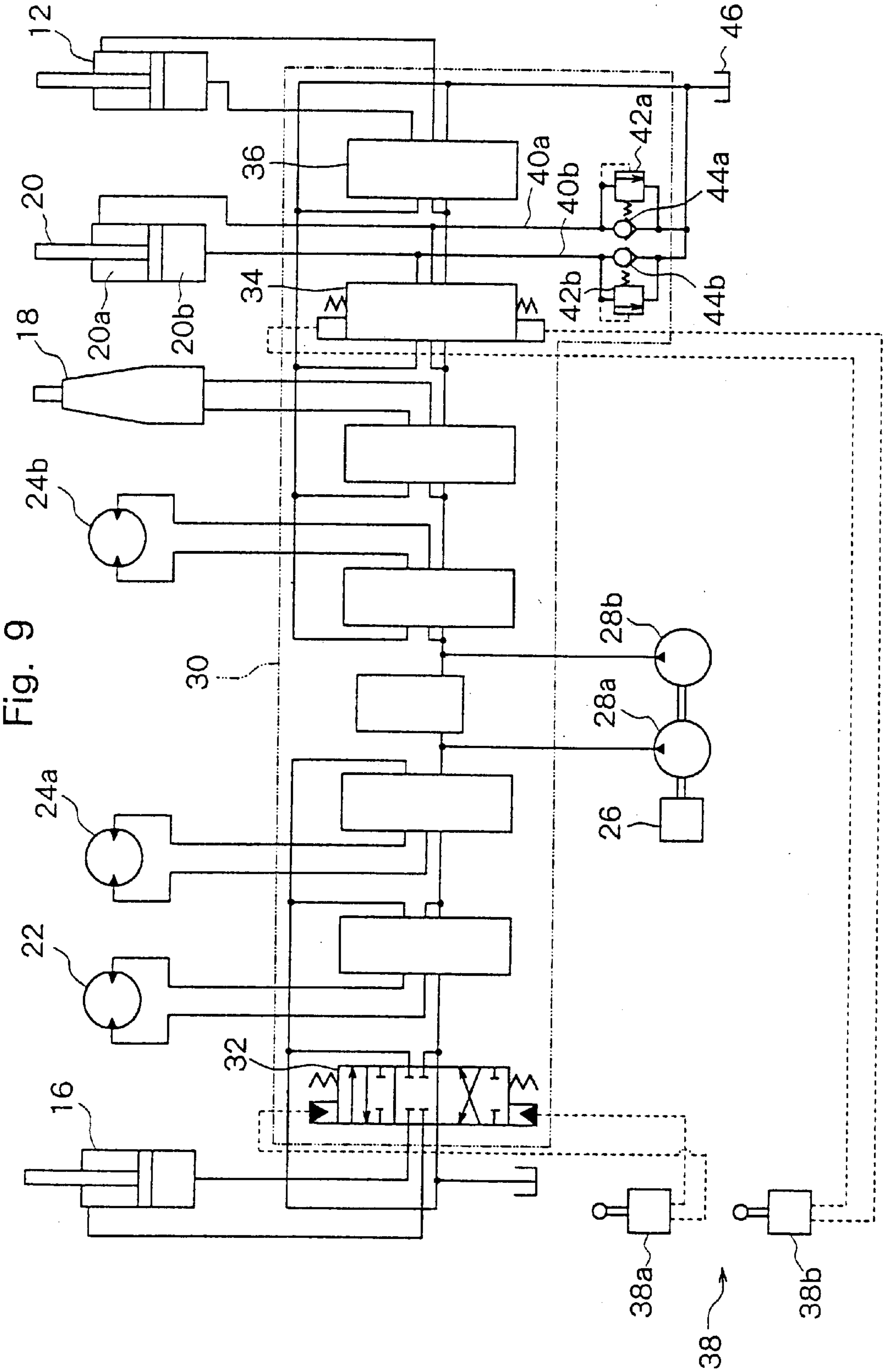
FIG. 9 is a diagram of a hydraulic circuit of the hydraulic shovel shown in FIG. 8. In the drawing, some portions are simply diagramed like in FIG. 1.

The third embodiment will now be described with reference to FIGS. 6 and 7. With reference to FIG. 6, the device for controlling a working arm includes a releasing means 84 for releasing the pressure confined in the actuation cylinder at a predetermined pressure lower than a set pressure of a cylinder relief valve and a control means 86 for controlling the opening/closing of the releasing means 84 in response to the operation condition of the working arm device.

The releasing means 84 includes a set pressure-varying relief valve 86*a* connected to a fluid passage 40*a* on the rod side and a set pressure-varying relief valve 86*b* connected to a fluid passage 40*b* on the head side, which link the attachment actuation cylinder 20 to the direction control valve 34, and further includes a pair of electromagnetic proportional reducing valves 92*a* and 92*b* constituting an adjustment means 92 for adjusting the set pressure and a pair of pilot change-over valves 88*a* and 88*b*. The set pressure-varying relief valves 86*a* and 86*b* are relief valves of which the set pressures are varied in response to an external signal. When a pilot pressurized fluid is guided, as an external signal, into the pilot chamber, the set pressure changes into a low pressure that meets the pressure. When there is no external signal, the set pressure-varying relief valves 86*a* and 86*b* work as relief valves of a set pressure corresponding to the conventional cylinder relief valves 42*a* and 42*b*. The low set pressure is set, for example, to a minimum predetermined pressure capable of supporting the weight of the attachment 18 (the setting of the pressure will be described later in detail). The electromagnetic proportional reducing valves 92*a* and 92*b* are the ones for controlling output by reducing the pressure of the output pilot fluid from the pilot pump 78 based on an output signal from the controller 90 (the controller 90 will be described later in detail). The outlet port of the electromagnetic proportional reducing valve 92*a* is connected to the pilot chamber of the set pressure-varying relief valve 86*a* via the pilot change-over valve 88*a,* and the outlet port of the electromagnetic proportional reducing valve 92*b* is connected to the pilot chamber of the set pressure-varying relief valve 86*b* via the pilot change-over valve 88*b*. The pilot change-over valves 88*a* and 88*b* are two-position change-over valves that are changed over by the pilot pressurized fluid. The pilot chamber of the pilot change-over valve 88*a* is connected to the output fluid passage L1 of the arm operation remote control valve 38*a,* and the pilot chamber of the pilot change-over valve 88*b* is connected to the output fluid passage L2 of the arm operation remote control valve 38*a*. When there is no output from the arm operation remote control valve 38*a,* the connection between the inlet port and the outlet port is interrupted. Upon receipt of an output, the inlet port and the outlet port are connected together.

The control means 86 includes an operation detector means 60, a contact detector means 66, a controller 90 and a load-setting unit 94. The operation detector means 60 and the contact detector means 66 are the same as used in the above-mentioned first embodiment, and are not described here. To the controller 90 are connected the operation detector means 60, the contact detector means and the load-setting unit 94. The controller 90 receives output signals from them (the controller 90 and the load-setting unit 94 will be described later in detail).

The controller 90 and the load-setting unit 94 will be described with reference to FIG. 7. The controller 90 includes a NOT arithmetic unit 68*a,* AND arithmetic units 68*b* and 68*c,* signal-setting units 90*a* and 90*b,* signal change-over units 90*c* and 90*d,* and electromagnetic proportional reducing valve drive units 90*e* and 90*f*. The NOT arithmetic unit 68*a* inverts the output signal of the pressure detector switch 64. The AND arithmetic unit 68*b* calculates the output signals of the NOT arithmetic unit 68*a* and of the limit switch 66*a,* and the AND arithmetic unit 68*c* calculates the output signals of the NOT arithmetic unit 68*a* and of the limit switch 66*b.* The results are output to the signal change-over unit 90*c* and to the signal change-over unit 90*d,* respectively. Based on a signal from the load-setting unit 94, the signal setting units 90*a* and 90*b* set signals for changing the set pressures of the set pressure-varying relief valves 86*a* and 86*b* to predetermined low pressures. Based on the outputs of the AND arithmetic units 68*b* and 68*c,* the signal change-over units 90*c* and 90*d* turn on/off the output signals of the signal-setting units 90*a* and 90*b.* Based on the output signals from the signal-setting units 90*a* and 90*b,* the electromagnetic proportional reducing valve drive units 90*e* and 90*f* drive the electromagnetic proportional reducing valves 92*a* and 92*b,* respectively. The load-setting unit 94 send the data of an attachment to the signal-setting units 90*a* and 90*b,* so that the set pressures of the set pressure-varying relief valves 86*a* and 86*b* are changed according to difference in the load such as kind, size or the like of the attachment 18.

Action of the above-mentioned third embodiment will be described with reference to FIGS. 6 and 7 together with FIGS. 10 and 11. First, the limit switch 66*a* is turned ON when the attachment 18 comes in contact with the stopper 14*a* (see FIG. 10) in a state where the attachment actuation cylinder 20 is contracted. When the attachment operation remote control valve 38*b* is not operated, the output signal of the pressure detector switch 64 becomes OFF which is, then, inverted through the NOT arithmetic unit 68*a* to produce an ON signal. Therefore, the AND arithmetic unit 68*b* receiving the ON signal from the limit switch 66*a* outputs the ON signal, whereby the signal change-over unit 90*c* is turned ON to drive the electromagnetic proportional reducing valve 92*a* through the electromagnetic proportional reducing valve drive unit 90*e.* In this state, when the arm operation remote control valve 38*a* is operated toward the side of extending the arm actuation cylinder 16 (i.e., the arm 14 turns in a direction indicated by the arrow U in FIG. 10), the output pilot fluid flows into the fluid passage L1 and is guided into the one pilot chamber 32*a* of the direction control valve 32 for arm, and is further guided, as a change-over signal, to the pilot chamber of the change-over valve 88*a* thereby to change over the change-over valve 88*a.* Consequently, the pilot pressurized fluid of the electromagnetic proportional reducing valve 92*a* is guided to the relief valve 86*a* through the change-over valve 88*a* as an external signal for changing the set pressure. Accordingly, when the load of the attachment 18 is set in advance by the load-setting unit 94, the signal-setting unit 90*a* produces a signal corresponding to the attachment 18, and the relief valve 86*a* is changed into a predetermined set pressure corresponding to the weight of the attachment 18. The actuation fluid in the fluid chamber 20*a* on the rod side is released into the tank 56 through the relief valve 86*a.* Further, the attachment actuation cylinder 20 extends while supporting the weight of the attachment 18.

Next, the limit switch 66*b* is turned ON when the attachment 18 comes into contact with the stopper 14*b* (see FIG. 11) in a state where the attachment actuation cylinder 20 is extended. When the attachment operation remote control valve 38*a* is not operated, the output signal of the pressure detector switch 64 becomes OFF which is, then, inverted through the NOT arithmetic unit 68*a* to produce an ON signal. Therefore, the AND arithmetic unit 68*c* receiving the ON signal from the limit switch 66*a* outputs the ON signal, whereby the signal change-over unit 90*d* is turned ON to drive the electromagnetic proportional reducing valve 92*b* through the electromagnetic proportional reducing valve drive unit 90*f.* In this state, when the arm operation remote control valve 38*a* is operated toward the side of contracting the arm actuation cylinder 16 (i.e., the arm 14 turns in a direction indicated by the arrow D in FIG. 11), the output pilot fluid flows into the fluid passage L2 and is guided into the other pilot chamber 32*b* of the direction control valve 32 for arm, and is further guided, as a change-over signal, into the pilot chamber of the change-over valve 88*b* thereby to change over the change-over valve 88*b.* Consequently, the pressurized fluid in the electromagnetic proportional reducing valve 92*b* is guided into the relief valve 86*b* through the change-over valve 88*b.* Accordingly, when the load of the attachment 18 is set in advance by the load-setting unit 94, the signal-setting unit 90*b* produces a signal corresponding to the attachment 18, and the relief valve 86*b* is changed into a predetermined set pressure corresponding to the weight of the attachment 18. The actuation fluid in the fluid chamber 20*b* on the head side is released into the tank 56 through the relief valve 86*b.* Further, the attachment actuation cylinder 20 contracts while supporting the weight of the attachment 18.

When the attachment operation remote control valve 38*b* is operated during the above action, the output signal of the pressure detector switch 64 is turned ON due to the output pilot fluid guided through the high pressure selection valve 62 and the ON signal is inverted through the NOT arithmetic unit 68*a* to output an OFF signal. The AND arithmetic unit 68*b* or 68*c* produces an OFF signal, the corresponding signal change-over unit 90*c* or 90*d* is turned OFF, and neither the electromagnetic proportional reducing valve drive units 90*e,* 90*f* nor the electromagnetic proportional reducing valves 92*a,* 92*b* are driven. Therefore, the releasing means 84 does not actuate.

By the above-mentioned operation, loss of energy can be decreased and the operability can be improved because even when the arm actuation cylinder 16 is actuated in a state where the attachment 18 is in contact with the stopper 14*a* or 14*b* and the attachment actuation cylinder 20 is in a state of being maintained at its position, the pressure confined in the attachment actuation cylinder 20 is released at a predetermined low pressure varied by the set pressure-varying relief valves 86*a,* 86*b* and the attachment actuation cylinder 20 is extended or contracted while supporting the weight of the attachment 18.

In the above third embodiment, the set pressures of the set pressure-varying relief valves 86*a* and 86*b* set to pressures corresponding to the pressures of the conventional cylinder relief valves 42*a* and 42*b,* are changed into predetermined low pressures in response to an external signal. Therefore, there is no need of separately providing the relief valves 42*a* and 42*b* unlike the above-mentioned first and second embodiments. When the attachment 18 is not a breaker, but is exchanged to be, for example, a crusher, a clamshell bucket, a fork or a compactor to meet the work, the set pressure can be easily changed by the load-setting unit 94.

When known filters are added between the signal change-over units 90*c,* 90*d* and the electromagnetic proportional reducing valve drive units 90*e,* 90*f* in the controller 90 in order to mildly raise and close the output signals of the signal-setting units 90*a,* 90*b,* the set pressure changed over in a manner of turning on and off can be changed over smoothly and hence, the shock that occurs in the working arm device due to the switch-over operation can be reduced.

Though the invention was described above in detail by way of embodiments, it should be noted that the present invention is in no way limited to the above embodiments only but can be varied or modified in a variety of ways without departing from the scope of the invention.

(1) Working Arm Device

The embodiments of the present invention have dealt with the front shovel device of the hydraulic shovel. However, the device for controlling a working arm of the invention can be further applied to any other working arm device such as a lift arm device of a wheel loader. The known lift arm device in the wheel loader includes a lift arm which is an arm member that can be freely turned, a bucket which is a turning member pivotably mounted on the lift arm, a lift cylinder which is an arm member actuation cylinder for actuating the lift arm, a tilt cylinder which is a turning member actuation cylinder for actuating the bucket, and stoppers for limiting the turning ends of the bucket. Therefore, the pressure that generates and is confined in the tilt cylinder can be released at a low pressure when the lift cylinder is extended or contracted in a state where the bucket is in contact with the stopper and the tilt cylinder is not in operation.

(2) Operation Signal of Releasing Means

In the embodiments of the present invention, the output pilot fluid of the pilot operation means is used as an operation signal from the control means that operates the releasing means. In the working machine having an electric operation means as operation means, however, the output electric signal thereof may be used as an operation signal for the releasing means thereby to operate the change-over valve or to operate the set pressure-varying relief valve.

(3) Relief Valve of Releasing Means

In the first and second embodiments of the present invention, the pressure of the relief valve 58 in the releasing means 50 has been set to a predetermined value in advance. Instead of it, there may be employed, however, a relief valve, of which the set pressure can be suitably changed in response to an external signal, such as a set pressure-varying relief valve in the third embodiment.

(4) Turning Member

In the embodiments of the invention, the attachment 18 is mounted as a turning member on the arm member. The turning member, however, is not limited to the attachment 18 only but may be the one constituted by further coupling the arm member thereto.

According to a device for controlling a working arm of a working machine, constituted by the present invention, there is provided a device for controlling a working arm of a working machine, which is capable of releasing the pressure of the actuation fluid confined in the actuation cylinder of the working arm device at a predetermined pressure lower than the set pressure, without changing the set pressure of the cylinder relief valve, and in which the opening/closing of the cylinder relief valve is controlled.

What is claimed is:

1. A device for controlling a working arm of a working machine comprising:

a releasing means for releasing a pressurized fluid feed/drain circuit of an actuation cylinder of a working arm device at a predetermined pressure lower than a set pressure of a cylinder relief value provided for said feed/drain circuit; and a control means for controlling the opening/closing of said releasing means, wherein said working arm device comprises a turnable arm member, a turning member mounted on the arm member so as to freely turn, an arm member actuation cylinder for actuating said arm member, a turning member actuation cylinder for actuating said turning member, and stoppers for limiting the turning ends of said turning member, and said control means operates said releasing means in a state where said turning member is in contact with said stopper, said turning member actuation cylinder is not in operation and said arm member actuation cylinder is in operation.

2. A device for controlling a working arm of a working machine according to claim 1, wherein said control means includes a contact detector means for detecting the contact of said turning member with said stopper and an operation detector means for detecting the operation of said turning member actuation cylinder, and operates said releasing means by using an operation signal for operating said arm member actuation cylinder based on output signals from said contact detector means and from said operation detector means.

3. A device for controlling a working arm of a working machine according to claim 2, wherein said arm member actuation cylinder is operated by a pilot operation means, and uses a pilot fluid output from said operation means as said operation signal.

4. A device according to claim 2, wherein the operation detector means comprises a high pressure selection valve comprising an outlet port, a remote control valve comprising a pair of outlet ports, and a pressure detector switch wherein the high pressure selection valve is connected to the outlet ports of the remote control valve and the pressure detector switch is at the outlet port of the high pressure selection valve.

5. A device according to claim 2, wherein the contact detector means comprises limit switches.

6. A device according to claim 2, wherein the contact detector means comprises change-over valves.

7. A device for controlling a working arm of a working machine according to claim 1, wherein said releasing means includes a direction change-over valve connected to said pressurized fluid feed/drain circuit and a relief valve connected to the outlet port of said direction change-over valve, and changes over said direction change-over valve by using said control means.

8. A device for controlling a working arm of a working machine according to claim 1, wherein said releasing means includes a set pressure-varying relief valve for varying the set pressure in response to an external signal and an adjustment means for adjusting said external signal, and controls said external signal by using said control means.

9. A device according to claim 1, wherein the control means comprises a controller and a pair of electromagnetic change-over valves.

10. A device according to claim 9, wherein the controller comprises a NOT arithmetic unit, arithmetic units, and electromagnetic change-over valve drive units, wherein the arithmetic units calculate output signals of the NOT arithmetic unit and output results to respective electromagnetic change-over valve drive units.

11. A device according to claim 1, wherein the control means comprises a pair of pilot change-over valves.

12. A device according to claim 1, wherein the releasing means comprises a set pressure-varying relief valve connected to a fluid passage on a rod side and a set pressure-varying relief valve connected to a fluid passage on a head side.

13. A device according to claim 12, wherein the releasing means further comprises an adjustment means, and a pair of pilot change-over valves.

14. A device according to claim 13, wherein the adjustment means comprises a pair of electromagnetic proportional reducing valves.

15. A device according to claim 1, wherein the control means comprises an operation detector means, a contact detector means, a controller, and a load-setting unit.

16. A device according to claim 15, wherein the controller comprises a NOT arithmetic unit, arithmetic units, signal-setting units, signal change-over units, and electromagnetic proportional reducing valve drive units, wherein the arithmetic units calculate output signals from the NOT arithmetic unit, the results from the arithmetic units are output to respective signal change-over units, the signal change-over units output signals to the electromagnetic proportional reducing valve drive units and turn on/off the output signals of the signal-setting units.

* * * * *